United States Patent [19]

Münchow et al.

[11] Patent Number: 4,969,622
[45] Date of Patent: Nov. 13, 1990

[54] SUPPORT FOR SEATS OF AUTOMOTIVE VEHICLES

[75] Inventors: Andrea Münchow; Peter Thiel, both of Remscheid, Fed. Rep. of Germany

[73] Assignee: Keiper Recaro GmbH & Co., Remscheid, Fed. Rep. of Germany

[21] Appl. No.: 424,113

[22] Filed: Oct. 19, 1989

[30] Foreign Application Priority Data

Oct. 25, 1988 [DE] Fed. Rep. of Germany ....... 3836248

[51] Int. Cl.$^5$ ............................................ F16M 13/00
[52] U.S. Cl. .................................. 248/429; 296/65.1; 297/341
[58] Field of Search ......................... 248/430, 429, 424; 296/65.1; 297/341; 384/34, 47

[56] References Cited

U.S. PATENT DOCUMENTS

| | | | |
|---|---|---|---|
| 2,780,501 | 2/1957 | Rosenberg | 248/430 X |
| 3,685,872 | 8/1972 | Babbs | 248/430 X |
| 4,238,099 | 12/1980 | Hunwicks | 248/430 |
| 4,781,354 | 11/1988 | Nihei et al. | 248/430 X |
| 4,804,226 | 2/1989 | Schmale | 297/216 |
| 4,809,939 | 3/1989 | Matsushima et al. | 248/430 |
| 4,852,846 | 8/1989 | Weier | 248/430 |
| 4,863,289 | 9/1989 | Lecerf | 248/430 X |

FOREIGN PATENT DOCUMENTS 2901602 7/1979 Fed. Rep. of Germany ...... 248/430
3221959 12/1983 Fed. Rep. of Germany .

Primary Examiner—Ramon O. Ramirez
Attorney, Agent, or Firm—Peter K. Kontler

[57] ABSTRACT

The vertically adjustable seat of a motor vehicle is mounted on two spaced-apart parallel rails each of which is reciprocable along a discrete track having an inverted C-shaped cross-sectional outline. Each rail has two spaced-apart parallel vertical sidewalls which are held apart and are connected to each other by several laminae and bolts serving to urge the edge faces of the laminae against the inner sides of the sidewalls. The marginal portions of the laminae have projections which are received in complementary sockets of the sidewalls. The sidewalls are extrusions of light metal, and the laminae are made of the same material. The rear end portion of one of the rails has a coupling for one end portion of a safety belt, and the configurations of the lower portions of the sidewalls and the adjacent portions of the track are such that the rails are confined to reciprocatory movement longitudinally of the respective tracks.

18 Claims, 1 Drawing Sheet

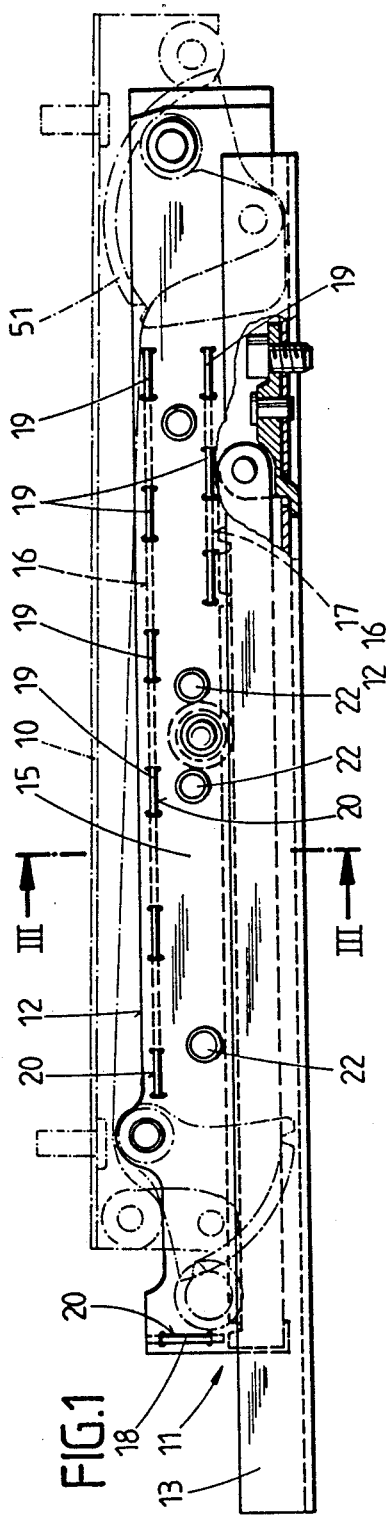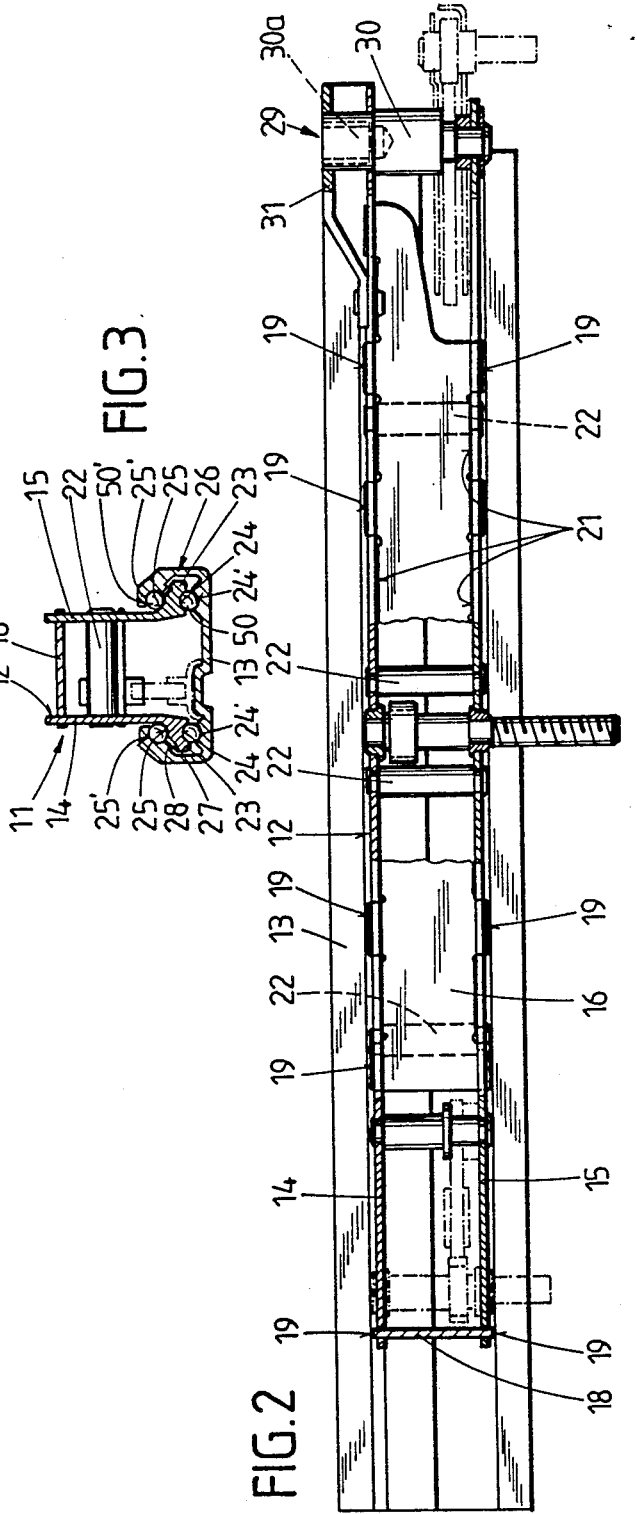

4,969,622

SUPPORT FOR SEATS OF AUTOMOTIVE VEHICLES

BACKGROUND OF THE INVENTION

The invention relates to supports for seats, especially for seats of motor vehicles. More particularly, the invention relates to improvements in supports of the type wherein a fixed first rail (hereinafter called guide or track) movably supports and guides a second rail which is affixed to or forms part of a movable seat. Still more particularly, the invention relates to improvements in supports which are normally used in pairs, one along each side of the body-supporting portion of an adjustable seat.

German Pat. No. 32 21 959 discloses a support wherein two spaced-apart walls are connected to each other to resemble a substantially box-shaped body which serves as a supporting rail and is movable along its track. The walls of the rail have a semicircular cross-sectional outline and constitute elongated shells provided with flange-like upper portions which are spot-welded to each other and serve to carry the seat. The walls are made of sheet steel and the thus formed supporting rail is put to use when the configuration of the adjacent rail-shaped portion of the seat is rather complex so that it cannot be readily made of profiled rolled steel. The rail-shaped portion is called upon to stand pronounced stresses in the event of an accident (it being assumed here that the seat which is mounted on a pair of rails each composed of two shell-shaped sections is the seat in a motor vehicle); therefore, the shells of each supporting rail must be made of relatively thick sheet steel in order to ensure that the supporting rails will exhibit the required stability. This contributes to the bulk and weight of the supporting rails and of the combinations of supporting rails and their tracks. On the other hand, the manufacturers of motor vehicles attempt to reduce the weight of component parts to a minimum and to use lightweight materials whenever the use of such materials does not affect the stability, reliability and safety of the vehicles.

OBJECTS OF THE INVENTION

An object of the invention is to provide a support which is lighter than but is at least as reliable as heretofore known supports for seats, such as the seats of motor vehicles.

Another object of the invention is to provide a support which can be assembled from a small number of simple, inexpensive and compact parts.

A further object of the invention is to provide a support the weight of which is a relatively small fraction of the weight of a standard support.

An additional object of the invention is to provide a support which can consist of or can contain parts made of aluminum or other lightweight material without affecting the safety of the seat.

Still another object of the invention is to provide a method of making a support of the above outlined character.

An additional object of the invention is to provide a novel and improved rail for use in the above outlined support.

A further object of the invention is to provide a novel and improved track for use in the above outlined support.

An additional object of the invention is to provide a combination of several supports with a seat, particularly a seat for use in motor vehicles.

Another object of the invention is to provide a novel and improved mounting for a safety belt.

SUMMARY OF THE INVENTION

The invention is embodied in a support for a seat, particularly the seat of a motor vehicle. The improved support includes an elongated track or guide and an elongated rail which is movable longitudinally of and along the track. In accordance with a feature of the invention, the rail comprises two spaced-apart elongated sidewalls and distancing means disposed between and connecting the sidewalls to each other. The distancing means comprises at least one lamina, e.g., a thin plate made of aluminum or another light metal. In accordance with a presently preferred embodiment, the distancing means comprises a plurality of suitably distributed laminae and the distancing means preferably further comprises one or more bolts which extend transversely of and between the sidewalls and have end portions which are preferably anchored in the respective sidewalls. Such end portions can resemble the heads of rivets.

The sidewalls are disposed in first planes (preferably in two parallel substantially vertical planes when the support is in actual use), and the laminae are disposed in at least one second plane which extends transversely of the first planes. The laminae have marginal portions which are adjacent the sidewalls, and each marginal portion has at least one projection received in a socket of the adjacent sidewalls. The marginal portions of at least one of the plural laminae can have rows or files of projections. The projections of such rows or files can have a substantially rectangular cross-sectional outline, and the marginal portions of the lamina having such rows or files of projections preferably have recesses which alternate with the projections of the respective rows or files. The marginal portions of the lamina with rows or files of projections have surfaces which are provided in the recesses and abut the inner sides of the respective sidewalls. The sockets are preferably complementary to the corresponding projections, i.e., they are or they can be at least substantially filled by the corresponding projections.

The sidewalls and the laminae can jointly form a substantially box-shaped hollow body, and the aforementioned surfaces in the recesses of the marginal portions of the lamina with rows or files of projections together form edge faces which are adjacent the inner sides of the respective sidewalls. The aforementioned bolt or bolts of the distancing means serve to maintain the edge faces of the lamina with plural rows or files of projections in abutment with the inner sides of the respective sidewalls.

Each sidewall and the track can constitute an extrusion, e.g., an extrusion made of aluminum or another light metal.

Furthermore each sidewall can include a longitudinally extending flange which is adjacent and is preferably confined in the track. Such support can further include at least one row of rolling elements (e.g., in the form of balls) which are interposed between each flange and the track. To this end, each flange has a race for the respective row of rolling elements. The track can have a substantially C-shaped cross-sectional outline and can be provided with a race for each row of rolling elements. The flanges of the sidewalls can form part of, or they can constitute, means for confining the sidewalls to movement longitudinally of the track. The track is preferably provided with grooves for the preferably outwardly extending flanges of the sidewalls, and the flanges can be received in their grooves with at least some play.

The support can further comprise means for coupling one end of a safety belt to the rear end portion of at least one sidewall. Such coupling means can comprise a stud or post which extends between and is affixed to the rear end portions of the sidewalls. The stud can comprise a threaded portion, and one of its end portions preferably extends outwardly beyond the rear end portion of one of the sidewalls. A bracket or other reinforcing means can be connected to such outwardly projecting end portion of the stud and to the one sidewall.

As a rule, the seat will be mounted on two spaced-apart supports of the above outlined character, namely one support is adjacent each side of that portion of a seat which carries the weight of the occupant.

The novel features which are considered as characteristic of the invention are set forth in particular in the appended claims. The improved support itself, however, both as to its construction and the mode of making and assembling the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a side elevation view of a support which embodies one form of the invention, a portion of the seat being indicated by phantom lines;

FIG. 2 is a plan view of the support, with portions broken away; and

FIG. 3 is a transverse sectional view of the support as seen in the direction of arrows from the line III—III of FIG. 1.

DESCRIPTION OF PREFERRED EMBODIMENTS

FIG. 1 shows by phantom lines a portion of a seat 10 which can be of the type described and shown in commonly owned U.S. Pat. No. 4,804,226 granted Feb. 4, 1989 to Gerhard Schmale for "Deformation-resistant frame for seats of motor vehicles". The disclosure of this patent is incorporated herein by reference. The seat 10 is vertically adjustably mounted on the rail 12 of a novel support 11 which further includes a second rail in the form of a guide or track 13 for the rail 12. The seat 10 is mounted on the rails 12 of two supports 11 which are or can be identical with each other save for certain details which will be explained hereinafter.

The rail 12 includes two spaced-apart parallel upright sidewalls 14, 15 and distancing means including three laminae 16, 17, 18 and several elongated bolts 22. The laminae 16–18 are disposed in planes which extend transversely of the planes of the sidewalls 14 and 15. The sidewalls 14, 15 and the laminae 16–18 together form a hollow box-shaped body which is highly resistant to deforming and other stresses and is held together by the end portions of the bolts 22, such end portions resembling the heads of rivets and extending through registering holes or bores of the sidewalls 14 and 15.

The marginal portions of the lamina 16 are provided with rows or files of spaced-apart aligned projections 19 each of which has a substantially rectangular cross-sectional outline and each of which fits rather snugly into and at least substantially fills a complementary socket 20 in the upper marginal portion of the adjacent sidewall 14 or 15. The lamina 17 is disposed at a level beneath the lamina 16 and its marginal portions are provided with shorter rows or files of projections 19. The plane of the lamina 18 is normal to the planes of the laminae 16, 17 and each marginal portion of the lamina 18 is provided with a single projection 19. The projections 19 of marginal portions of the laminae 16 and 17 alternate with recesses 21 which are bounded in part by surfaces abutting the inner sides of the adjacent sidewalls 14, 15. Such surfaces form part of the respective edge faces of the laminae 16 and 17. The upset end portions of the bolts 22 at the outer sides of the sidewalls 14, 15 ensure that the projections 19 cannot leave the respective sockets 20 and that the edge faces of the laminae 16, 17 between the projections 19 of the respective rows or files remain in abutment with the inner sides of the respective sidewalls.

The lower portion of each of the sidewalls 14, 15 has an outwardly extending flange 23 which is confined in the track 13 and forms part of means 26 for confining the rail 12 to movements in the longitudinal direction of the track 13. The underside of each flange 23 is provided with a first race 24, and the upper side of each flange 23 is provided with a second race 25. The races 24, 25 of the flanges 23 confront complementary races 24' and 25' of the track 13. First rows of spherical antifriction rolling elements 50 are installed between the pairs of races 24, 24', and second rows of spherical antifriction rolling elements 50' are installed between the pairs of races 25, 25'. The flanges 23 are received, with a certain amount of play, in internal grooves 28 of the track 13. The aforementioned play or clearance is established between the portions 27 of the flanges 23 and the adjacent portions of surfaces bounding the respective grooves 28.

The track 13 has a substantially C-shaped cross-sectional outline, and its upwardly extending legs cooperate with the respective flanges 23 to confine the rail 12 to movements in the longitudinal direction of the races 24, 25, 24' and 25'. This track is preferably an extrusion, the same as the sidewalls 14 and 15.

The illustrated rail 12 is further provided with means 29 for coupling to its rear end portion a safety belt of the type employed in conjunction with the adjustable seats of motor vehicles. The coupling means 29 comprises a stud or post 30 which extends between and connects the rear end portions of the sidewalls 14, 15 to each other. This stud has an internally threaded portion 30a for one end portion of a safety belt, and its upper end portion (as seen in FIG. 2) projects outwardly beyond the outer side of the sidewall 14 and is surrounded by a portion of a bracket 31 which is riveted to the sidewall 14. The coupling means 29 ensures that the respective end portion of the belt shares the movements of the rail 12 relative to the track 13. The stud 30 further carries a gear segment 51 (indicated in FIG. 1 by phantom lines) which forms part of the means for changing the level of the seat 10.

As used herein, the term "lamina" is intended to denote a relatively thin plate of metallic or other suitable material which extends between and has its projections 19 anchored in the adjacent sidewalls 14 and 15. The laminae 16–18 and the sidewalls 14, 15 can be mass-produced by extrusion of a light metal. This contributes significantly to a reduction of the weight of the rail 12. The track 13 can be made of the same material as the laminae 16–18 and the sidewalls 14, 15. The assembly of laminae 16–18 and sidewalls 14, 15 into a substantially box-shaped hollow body (which is held together by the bolts 22) contributes to the strength of the rail 12 in spite of the light weight of its constituents.

The confining means 26 enhances the safety of the support 11, especially in the event of an automobile accident, by preventing the flanges 23 from leaving the confines of the adjacent legs of the track 13.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A support for a seat, such as the seat of a motor vehicle, comprising an elongated track; and an elongated rail movable longitudinally of and along said track, said rail comprising two spaced-apart elongated sidewalls and distancing means disposed between and connecting said sidewalls to each other, said distancing means comprising a plurality of laminae, said sidewalls being disposed in first planes and said laminae being disposed in at least one second plane extending transversely of said first planes, said laminae having marginal portions adjacent said sidewalls and each marginal portion having at least one projection, said sidewalls having sockets for said projections.

2. The support of claim 1, wherein said distancing means further comprises at least one bolt.

3. The support of claim 1, wherein the marginal portions of at least one of said laminae have rows of projections.

4. The support of claim 3, wherein the projections of said at least one lamina have a substantially rectangular cross-sectional outline and the marginal portions of said at least one lamina have recesses which alternate with the laminae of the respective rows of laminae.

5. The support of claim 4, wherein the marginal portions of said at least one lamina have surfaces provided in said recesses and abutting the respective sidewalls, the sockets for the projections of said rows being at least substantially filled by the respective projections.

6. The support of claim 1, wherein each of said sidewalls is an extrusion.

7. The support of claim 1, wherein each of said sidewalls includes a longitudinally extending flange adjacent said track, and further comprising at least one row of rolling elements interposed between each of said flanges and said track.

8. The support of claim 7, wherein each of said flanges has a race for the respective row of rolling elements.

9. The support of claim 8, wherein said track has a substantially C-shaped cross-sectional outline and has a race for each row of rolling elements.

10. The support of claim 9, wherein said track is an extrusion.

11. The support of claim 1, wherein said sidewalls extend into said track and further comprising means for confining said sidewalls to movement longitudinally of said track.

12. The support of claim 11, wherein said confining means comprises lateral flanges provided on said sidewalls and said track has grooves for the flanges of said sidewalls.

13. The support of claim 12, wherein said flanges are received in the respective grooves with play.

14. A support for a seat, such as the seat of a motor vehicle, comprising an elongated track; an elongated rail movable longitudinally of and along said track, said rail comprising two spaced-apart elongated sidewalls and distancing means disposed between and connecting said sidewalls to each other, said distancing means comprising a plurality of laminae and said sidewalls having first and second end portions; and means for coupling a safety belt to the first end portion of at least one of said sidewalls.

15. The support of claim 14, wherein said coupling means comprises a stud extending between and affixed to the first end portions of said sidewalls.

16. The support of claim 15, wherein said stud comprises a threaded portion.

17. The support of claim 15, wherein said stud includes an end portion extending outwardly from and beyond the first end portion of one of said sidewalls and said coupling means further comprising a reinforcing bracket connecting to said one sidewall and to the end portion of said stud.

18. A support for a seat, such as the seat of a motor vehicle, comprising an elongated track; and an elongated rail movable longitudinally of and along said track, said rail comprising two spaced-apart elongated sidewalls and distancing means disposed between and connecting said sidewalls to each other, said distancing means comprising a plurality of laminae, said sidewalls and said laminae together forming a box-shaped hollow body and said sidewalls having inner sides, said laminae having edge faces adjacent said inner sides and said distancing means further comprising bolts connecting said sidewalls to each other and urging said inner sides against the respective edge faces of said laminae.

* * * * *